Patented July 6, 1943

2,323,391

UNITED STATES PATENT OFFICE 2,323,391

BETA-AMINO ACID AMIDES AND METHOD OF MAKING SAME

Henry G. Goodman, Jr., Pittsburgh, Pa., assignor to Carbide and Carbon Chemicals Corporation, a corporation of New York No Drawing. Application June 29, 1940, Serial No. 343,160

9 Claims. (Cl. 260—562)

This invention relates to new chemical compounds; in particular to condensation products of amines in which an alkyl radical containing at least two carbon atoms is attached to the amino nitrogen atom with β-hydroxy,α,β unsaturated open chain acid amides (β-keto open chain acid amides) of the structural formulae:

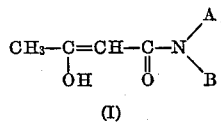

(I)

or

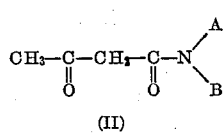

(II)

in which A is hydrogen or an aliphatic or aromatic radical, and B is an aliphatic or aromatic radical.

Condensation products of the type with which the present invention is concerned are soluble in organic solvents and exhibit properties which make them useful as ingredients of dye stains and dye stain solvents as aids in dispersing staining dyes in organic solvents. Dye stains and dye stain solvents containing such products are described in my copending application Serial No. 338,378, filed June 1, 1940.

The scope of the invention and the new chemical compounds included therein may be represented by the probable structural formula:

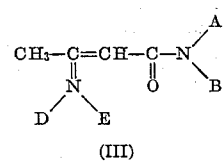

(III)

in which A is hydrogen or an aliphatic or aromatic radical; B is an aliphatic or aromatic radical; D is hydrogen or an aliphatic radical containing at least two carbon atoms, and E is an aliphatic radical containing at least two carbon atoms. Such an arrangement would fall within the "triad grouping" of the classification of tautomeric compounds proposed by Laar (Berichte, 1885, vol. 18, page 648; Organic Chemistry, J. B. Cohen, 5th ed., New York, 1928, part II, page 351). Accordingly, new chemical compounds included within the scope of the invention may be represented by one or the other of the probable structural formulae:

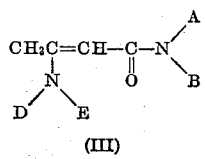

(III)

or

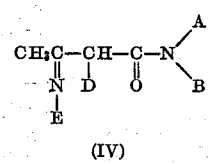

(IV)

when D is hydrogen and A, B, or E are as above set forth.

I have found that β-amino α,β unsaturated aliphatic acid amides of the present invention may be prepared by reacting the primary or secondary aliphatic amines with open chain β-hydroxy α,β unsaturated aliphatic acid amides. (β-keto aliphatic acid amides) in such a manner that condensation takes place with the elimination of one mole of water per mole of amine or amide reacted.

The reactants may be refluxed with an organic medium such as benzene until the water formed on condensation of the amine and the β-hydroxy α,β unsaturated acid amide separates or is isolated. The benzene may then be distilled off, under reduced pressure if desired, and the condensation product crystallized from a suitable solvent. If necessary, the condensation product may be washed prior to final crystallization.

I have found that the new chemical compounds of the present invention may be produced by condensing the β-hydroxy,α,β unsaturated aliphatic acid amide (β-keto aliphatic acid amide) with the following primary and secondary aliphatic amines having at least two carbon atoms in at least one of the aliphatic radicals attached to the amino-nitrogen atom:

Monooctylamine (mono 2-ethylhexylamine),
$CH_3(CH_2)_3CH(C_2H_5)CH_2NH_2$
Monoethanolamine, $HOCH_2CH_2NH_2$
Diethanolamine, $(HOCH_2CH_2)_2NH$
Isopropanolamine, $CH_3CHOHCH_2NH_2$ I have also found that the new chemical compounds of the present invention may be produced by condensing the primary or secondary aliphatic amine with one of the following β-hydroxy,α,β unsaturated aliphatic acid amide (β-keto aliphatic acid amides):

Acetoacetanilide, $CH_3COCH_2CONH(C_6H_5)$
Diacetoacetyl ethylene diamine,
$CH_3COCH_2CONHCH_2CH_2NHCOCH_2COCH_3$
o-Chloracetoacetanilide, $CH_3COCH_2CONHC_6H_4Cl$
Acetoacetyl diethanolamine,
$CH_3COCH_2CON(C_2H_4OH)_2$ As illustrative of the manner of preparing the condensation product, the following examples are given:

Example 1

*Condensation product of monooctylamine and acetoacetanilide*

Eighty-eight and one-half grams (0.5 mole) of acetoacetanilide and 64.5 grams (0.5 mole) of mono-2-ethylhexylamine were refluxed with 200 cc. of benzene until 9 cc. (0.5 mole) of water was isolated. The benzene was removed by distillation at reduced pressure and the remaining crude product recrystallized from petroleum ether. The final product possessed a melting point of 59–60° C.

Example 2

*Condensation product of monoethanolamine and acetoacetanilide*

Eighty-eight and one-half grams (0.5 mole) of acetoacetanilide and 30.5 grams (0.5 mole) of monoethanolamine were added to 200 cc. of benzene, and the mixture refluxed until completely in solution, and until 9 cc. (0.5 mole) of water was collected in the decanter provided to isolate the water of reaction. Upon cooling the mixture, an oily layer separated which eventually crystallized. This crude reaction product was recrystallized once from benzene. The products thus obtained possessed a melting point of 92–93° C.

Example 3

*Condensation product of diethanolamine and acetoacetanilide*

Eighty-eight and one-half grams (0.5 mole) of acetoacetanilide and 52.5 grams (0.5 mole) of diethanolamine were refluxed with 200 cc. of benzene until 9 cc. (0.5 mole) of water had collected in the decanter provided to isolate the water. The benzene was then removed by distillation under reduced pressure and the reaction product recrystallized once from ethanol. The product thus obtained possessed a melting point of 108–109° C.

Example 4

*Condensation product of monoisopropanolamine and acetoacetanilide*

Eight-eight and one-half grams (0.5 mole) of acetoacetanilide and 37.0 grams (0.5 mole) of monoisopropanolamine were refluxed with 200 cc. of benzene until 9 cc. (0.5 mole) of water had been isolated. The reaction product was crystallized from benzene and found to possess a melting point of 106–108° C.

Example 5

*Condensation product of monoethanolamine and o-chloracetoacetanilide*

Fifty-two and eight-tenths grams of o-chloracetoacetanilide (0.25 mole) and 15.3 grams of monoethanolamine (0.25 mole) were refluxed with 100 cc. of benzene until 4.5 cc. of water had been isolated. The charge was then cooled, whereupon crystallization of the product occurred. Upon recrystallization from ethanol, the product was found to have a melting point of 94–95° C.

Example 6

*Condensation product of monoethanolamine and diacetoacetyl ethylene diamine*

122.13 grams (2 moles) of monoethanolamine and 228 grams (1 mole) of diacetoacetyl ethylene diamine $(CH_3COCH_2CONHCH_2)_2$ were refluxed with 200 cc. of butanol. The butanol was finally distilled over with the water of reaction, amounting to about 36 grams (2 moles), and the residual amounts of butanol removed under reduced pressure. The residue was recrystallized from methanol. A white substance having a melting point of 65° C. was obtained.

Example 7

*Condensation product of monoethanolamine and acetoacetyldiethanolamine*

Sixty-one grams (1 mole) of monoethanolamine and 189 grams (1 mole) of acetoacetyldiethanolamine, $CH_3COCH_2CON(C_2H_5OH)_2$, were dehydrated with butanol in the manner described in Example 7. An amber-colored syrup was obtained which was not crystallizable by ordinary methods of crystallization.

The foregoing examples are illustrative in nature, and the products are representative of many other condensation products of such primary and secondary aliphatic amines having at least one aliphatic radical containing two or more carbon atoms with β-keto open chain acid amides are within the scope of this invention.

I claim:

1. Compounds of the structural formula

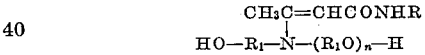

where R is a monovalent aromatic radical, $R_1$ is an alkylene hydrocarbon radical containing less than four carbon atoms, and $n$ is a character of the group consisting of 0 and 1.

2. Compounds of the structural formula

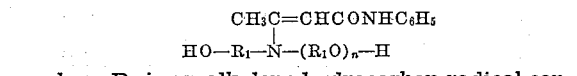

where $R_1$ is an alkylene hydrocarbon radical containing less than four carbon atoms, and $n$ is a character of the group consisting of 0 and 1.

3. A beta-amino crotonamide in which the tervalent beta-amino nitrogen atom has attached thereto from one to two alkylol radicals containing from two to four carbon atoms to the radical and the amide nitrogen atom has attached thereto at least one monovalent radical of the group consisting of aliphatic and aromatic radicals having not more than six carbon atoms, each remaining valence of said amino nitrogen atom and of said amide nitrogen atom which is unoccupied by such radicals, respectively, being occupied by hydrogen.

4. A compound of the structural formula

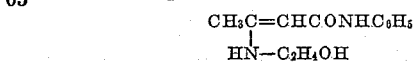

5. A compound of the structural formula

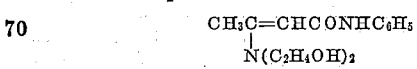

6. A compound of the structural formula

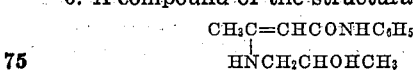

7. Process for the production of a beta-amino, alpha, beta-olefinic open chain, carboxylic acid amide, by condensing in substantially non-aqueous environment, an aliphatic amine in which the valences of the tervalent amino nitrogen atom are occupied by from one to two hydrogen atoms, each valence unoccupied by hydrogen being occupied by an aliphatic radical having at least two carbon atoms, and each such aliphatic radical of less than four carbon atoms attached to said nitrogen atom containing an alcoholic hydroxyl group, with a beta-keto, open chain, carboxylic acid amide in which the amide nitrogen atom has not more than one hydrogen atom attached thereto, which comprises forming a mixture containing the amine, the amide, and a relatively volatile organic diluent; and refluxing said mixture until water is formed in the condensation and separated from the condensation product in the proportion of one mol of water per mol of amine reacted.

8. Process for the production of a beta-amino crotonamide by condensing in substantially non-aqueous environment an aliphatic amine in which the valences of the tervalent amino nitrogen atom are occupied by from one to two hydrogen atoms, each valence unoccupied by hydrogen being occupied by an aliphatic radical having from two to eight carbon atoms and each such aliphatic radical of less than four carbon atoms attached to said nitrogen atom containing an alcoholic hydroxyl group, with an acetoacetamide in which the amide nitrogen atom has not more than one hydrogen atom attached thereto, which comprises forming a mixture containing the amine, the acetoacetamide and a relatively volatile organic diluent; and refluxing said mixture until water is formed in the condensation and separated from the condensation product in the proportion of one mol of water per mol of amine reacted.

9. Process for the production of a beta-amino crotonamide by condensing an alkylolamine having from one to two hydrogen atoms attached to the tervalent amino nitrogen atom, each valence unoccupied by hydrogen being occupied by an alkylol radical of from two to four carbon atoms, with an acetoacetamide in which the amide nitrogen atom has not more than one hydrogen atom attached thereto, which comprises forming a mixture containing the amine, the acetoacetamide and a relatively volatile organic diluent; and refluxing said mixture until water is formed in the condensation and separated from the condensation product in the proportion of one mol of water per mol of amine reacted.

HENRY G. GOODMAN, JR.